(12) United States Patent
Moehrle

(10) Patent No.: US 7,191,411 B2
(45) Date of Patent: *Mar. 13, 2007

(54) ACTIVE PATH MENU NAVIGATION SYSTEM

(76) Inventor: Armin E. Moehrle, 1824 N. Milwaukee Ave., Chicago, IL (US) 60647

( * ) Notice: Subject to any disclaimer, the term of this patent is extended or adjusted under 35 U.S.C. 154(b) by 91 days.

This patent is subject to a terminal disclaimer.

(21) Appl. No.: 10/164,520

(22) Filed: Jun. 6, 2002

(65) Prior Publication Data

US 2003/0227491 A1 Dec. 11, 2003

(51) Int. Cl.
*G06F 3/01* (2006.01)
*G06F 3/05* (2006.01)
*G06F 17/30* (2006.01)

(52) U.S. Cl. ............... 715/855; 715/829; 715/853; 715/854; 715/847

(58) Field of Classification Search ........... 715/854, 715/817, 843, 841, 853, 847, 846, 855, 810, 715/829, 828
See application file for complete search history.

(56) References Cited

U.S. PATENT DOCUMENTS

| | | | | |
|---|---|---|---|---|
| 5,801,702 | A * | 9/1998 | Dolan et al. ............... | 715/854 |
| 6,236,400 | B1 * | 5/2001 | Guerrero .................. | 715/841 |
| 6,240,410 | B1 * | 5/2001 | Wical ...................... | 707/4 |
| 6,256,028 | B1 * | 7/2001 | Sanford et al. ........... | 715/841 |
| 6,621,532 | B1 * | 9/2003 | Mandt ..................... | 348/841 |
| 6,633,316 | B1 * | 10/2003 | Maddalozzo et al. ..... | 715/854 |
| 6,832,350 | B1 * | 12/2004 | Bates et al. .............. | 715/501.1 |

FOREIGN PATENT DOCUMENTS

EP 0947921 A 10/1999

OTHER PUBLICATIONS

"RFC 1738 (RFC1738)", Dec. 1994, Internet RFC/STD/FYI/BCP Archives, pp. 1 and 4.*
Bowler D et al: "Navigation Bars for Hierarchical Web Sites" Student HCI Online Research Experiments, Online! 2001, pp. 1-23, XP002286023 University of Maryland, U.S.
Sun Microsystems Inc: "Quick Start to Using OpenStep Desktop", Online Sep. 1996, XP002286024, pp. 5-1 to 5-9.
IBM: "Fully Navigatable Breadcurm Trails" Research Disclosure, Kenneth Mason Publications, Hampshire, GB, vol. 461, No. 130, Sep. 2002, XP007131244, ISSN:0374-4353.

* cited by examiner

*Primary Examiner*—Raymond J. Bayerl
*Assistant Examiner*—Namitha Pillai
(74) *Attorney, Agent, or Firm*—Jonathan Feuchtwang

(57) ABSTRACT

A method for navigating within a multi-level hierarchical collapsing menu structure is disclosed. Each level in the menu structure contains plural items, each item being at least one of a function, a pointer to a location, and a pointer to another level. The method of the present invention includes a step of providing a graphical user menu system displaying the items of a given level and enabling selection thereof, wherein access of the given level requires sequential access of each of the levels preceding the given level in the hierarchy. An Active Path is dynamically constructed as a sequence of active links as items are selected using the graphical user menu system, with one active link correspond to each of the items selected. The active links provide direct access to a function corresponding level or menu item without the need to navigate using the graphical user menu system.

6 Claims, 6 Drawing Sheets c:\windows\applications\temp\help.doc 20 http://www.uspto.gov/patents/applications

ACTIVE PATH MENU NAVIGATION SYSTEM

FIELD OF THE INVENTION

The present invention generally relates to a navigation system used to navigate a hierarchical menu such as a directory structure or a pull-down menu. The menu navigation system of the present invention may be implemented in software executing on a standalone software program or on a client server application. More particularly, the menu navigation system of the present invention allows a user to access different levels in a hierarchical menu system without retracing back to the top level of the hierarchy.

BACKGROUND OF THE INVENTION

Hierarchical systems are used to organize items by function or theme in order to facilitate efficient locating of functions or locations. Hierarchical systems are used to organize documents into directories or folders and to organize functions into pull-down menus.

Conventionally one of two navigation systems are used to navigate through the various levels of a menu tree. By far the most popular menu navigation system is the so-called collapsing menu system which, for example, is used by many traditional personal computer applications. The distinguishing characteristics of this system are that the navigation always commences from the initial or root level and that the menu collapses or disappears after a selection is made.

Computer software frequently includes dozens of functions. The sheer number of features makes it desirable to organize the functions into a hierarchy of categories to facilitate efficient searching. In a collapsing menu system each level in the hierarchy is presented as a level in the pull-down menu.

FIG. 1A shows a top or root level 10 of a hypothetical menu. Each level 10 of the menu provides a list of menu choices 12. Each menu choice 12 could be an end node such as a function whose selection initiates some action, or the menu choice 12 could lead (point) to another level 10 providing a further list of menu choices 12. Selection of an end node will cause the pull-down menu to collapse back to the root level.

FIG. 1B shows the pull-down menu of FIG. 1A with several levels of the hierarchical menu expanded. The menu structure of FIG. 1B collapses back to the root level shown in FIG. 1A once an end node is selected. The defining characteristic of such a conventional navigation system is that navigation is one-way, and always starts from the root level to an end node. This method of navigation becomes cumbersome if the desired function or destination is buried several levels down from the root directory.

To address this shortcoming, conventional operating systems such as Microsoft Windows® provide short-cuts in the form of pre-defined function keys or icons. Such short-cuts enable the user to directly access the desired function associated with the short-cut.

In the absence of a pre-defined short-cut, the user must resort to navigating the menu structure. The problem with the collapsing menu system is that navigation must always commence from the root level. Consequently more experienced users are unable to take advantage of their knowledge of the hierarchical structure to directly access a given level.

FIG. 2A shows a conventional path menu system 20 used to navigate through the directory structure of a disk. Similarly, FIG. 2B shows a conventional universal resource locator (URL) command which operates similarly to the DOS path command of FIG. 2A. The conventional disk operating system (DOS) uses a path menu system 20 to navigate between various folders. Each folder represents a different level in the hierarchy. A given folder may contain one or more sub-folders. To access a target or destination level the user must know the path, i.e., the names of the each of the folders from the root folder to the target folder. A system of displaying the contents of each folder is provided to guide the user through the hierarchy. Namely, by typing a command such as DIRECTORY (DIR) the user is provided with the contents of the present folder and the path leading to the present folder. The user may proceed to a sub-level in the hierarchy or may retrace his/her steps to a preceding level by knowing the path.

Navigation using the path menu system requires the user to memorize and enter complex hierarchical sequences. This method of navigation is time consuming not suitable for users who have not memorized the path. Moreover, this method becomes extremely cumbersome as the number of levels increases.

Accordingly, one object of the present invention is to provide a more efficient way of navigating hierarchical menu systems.

SUMMARY OF THE INVENTION

A method for navigating within a multi-level hierarchical collapsing menu structure is disclosed. Each level in the menu structure contains plural items, each item being at least one of a function, a pointer to a location, and a pointer to another level.

The method of the present invention includes a step of providing a graphical user menu system displaying the items of a given level and enabling selection thereof, wherein access of the given level requires sequential access of each of the levels preceding the given level in the hierarchy. An Active Path is dynamically constructed as a sequence of active links as items are selected using the graphical user menu system, with one active link correspond to each of the items selected. The active links provide direct access to a function corresponding level or menu item without the need to navigate using the graphical user menu system.

According to a further aspect of the invention, pre-defined short-cuts are provided which enable direct access to a given menu item. The Active Path is dynamically constructed when one of the pre-defined short-cuts are executed, with one active link corresponding to each of the menu items necessary to access the given menu item using the graphical user menu system.

Navigation using the Active Path is accomplished by at least of one of rolling over and selecting an active link using a pointing device. Rolling over a given active link triggers the display of sibling menu items on the level associated with the given active link. Selecting a given active link triggers the execution of a function associated with the given active link.

These and other aspects of the present invention will be explained with reference to the drawings.

DETAILED DESCRIPTION OF THE PREFERRED EMBODIMENTS

Figures 2A, 2B, 3:
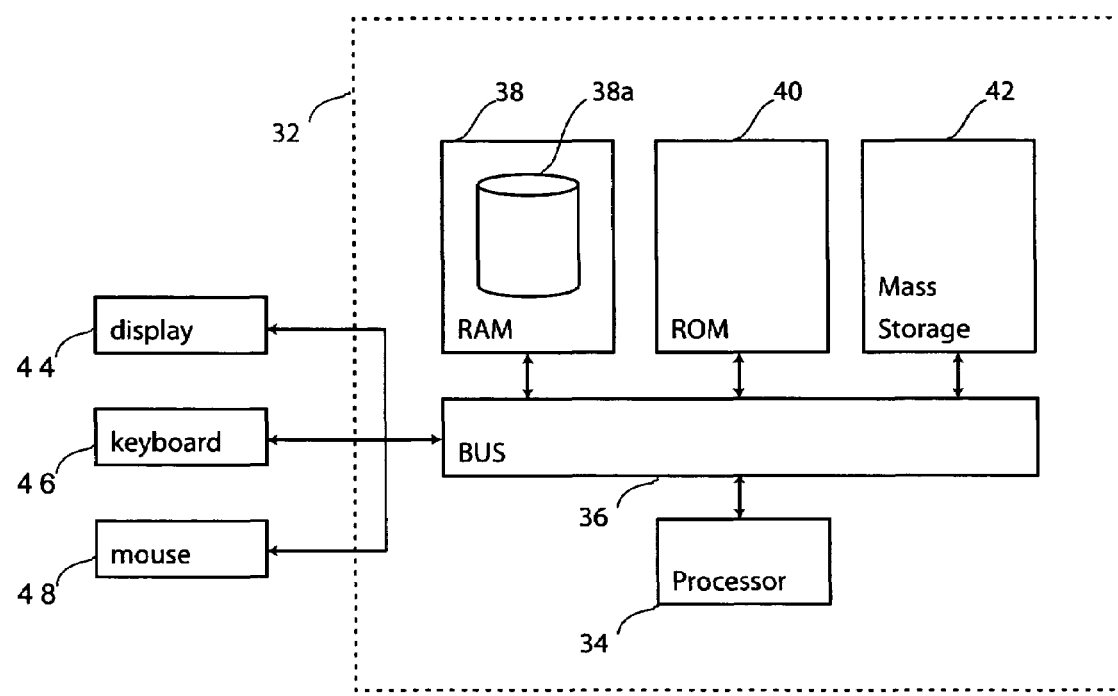
FIG. 2A is a view of a conventional path menu system.
FIG. 2B is a view of a conventional universal resource locator address.
FIG. 3 is a block diagram of a conventional computer architecture.

FIG. 3 is a block diagram of a computer 32 on which the software of the present invention operates. In the preferred embodiment, the main logic of the computer 32 is embodied by a general-purpose, programmable microprocessor 34, which in conventional practice will have an on-board memory cache (not shown) and which may be associated with one or more mathematics or other special-purpose coprocessors (not shown).

The processing logic generally represented by processor 34 is connected by a bus structure 36 to the various other components of the computer 32. The schematic representation of bus 36 is shown in FIG. 3 as a simple and unitary structure, but in conventional practice, as is known to those in the art, there usually are several buses and communication pathways 36, operating at different speeds and having different purposes. Further, bus 36 may be segmented and controlled by respective bus controllers, as is also known in the art.

Computer 32 will also have a random access memory unit or units 38 connected to the bus 36. RAM 38 (which may be DRAM, SDRAM or other known types) typically has loaded into it the operating system of the computer 32 and executable instructions for one or more special applications designed to carry out the invention. Computer 32 also has electronic read-only memory 40 for storing those programs such as the BIOS which are non-volatile and persist after the computer 32 is shut down.

In alternative embodiments of the invention, one or more components of the invention's logic may be "hard-wired" into the ROM 40 instead of loaded as software instructions into RAM 38. ROM 40 can consist of or comprise electrically programmable read-only memory (EPROM), electrically erasable and programmable read-only memory (EEPROM) of either flash or nonflash varieties, or other sorts of read-only memory such as programmable fuse or antifuse arrays.

In a typical architecture, a computer program suitable for carrying out the invention will be stored on a mass storage device 42, such as an optical disk or magnetic hard drive. Bus 36 connects mass storage device 42 to RAM 38. The computer 32 is connected to various peripheral devices used to communicate with an operator, such as display 44, keyboard 46, and pointing device (mouse) 48.

In operation, operating system software such as Microsoft Windows® executes on the computer 32, and the user interacts with the operating system using the display 44, keyboard 46, and pointing device (mouse) 48.

Figure 4:
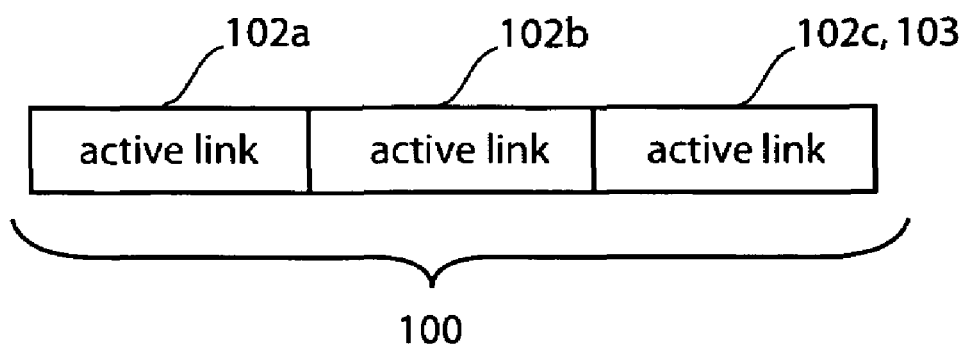
FIG. 4 is a view of the Active Path menu system of the present invention.

FIG. 4 shows the Active Path menu system 100 of the present invention which is visually similar to the conventional (DOS) path menu system of FIG. 2. However, whereas the conventional DOS path is merely a passive display of the hierarchical levels, the Active Path 100 is a graphical user interface enabling the user to directly access any of the hierarchical levels in a given path. Moreover, the Active Path 100 enables the user to directly re-execute the last function without the need to navigate to the function through the menu system, and without the need for a pre-defined short-cut.

As will be explained below, the Active Path 100 may be used in conjunction with a conventional navigation system such as the above-described collapsing menu system or path menu system.

The Active Path 100 consists of a sequential listing of active links 102, each active link 102 providing direct access to a corresponding level in the hierarchical path and to all of the menu items on the level (sibling menu items). The last active link 102 in the Active Path 100 is termed an end link 103. The Active Path 100 is dynamically assembled and displayed as the user navigates using the conventional menu screens. The Active Path 100 is assembled automatically without the need for any additional user interaction as the user navigates using the collapsing menu system.

In contrast, a conventional short-cut such as a function key, icon, or the like is static in that it only provides access to a single pre-defined item (function/location) within a given level and does not provide the user with the full range of items available within a given level. Moreover, the definition of a short-cut requires user interaction.

The Active Path 100 is automatically constructed as the user navigates between the various levels 10 of the conventional collapsing menu system. The first active link 102 corresponds to the root level, and each subsequent active link 102 corresponds to a user selected menu item 12 which may be a location or a classification (sublevel) of functions. As will be explained below, the end link 103 points either to a function or a location.

The Active Path 100 of the present invention may be used in place of the menu system 10 to navigate through classes of functions and execute a selected function. Moreover, the Active Path 100 may also be used to navigate to a desired location such as a web address or directory folder.

FIGS. 5A–5E show how the Active Path 100 may be used to navigate to classes of functions. In the embodiment depicted in FIGS. 5A–5D the Active Path 100 is used in conjunction with a conventional collapsing menu system. One of ordinary skill in the art will appreciate that the location of the Active Path 100 in relation to the collapsing menu system 10 and its graphical representation are not critical to the operation of the Active Path 100.

Figure 5A:
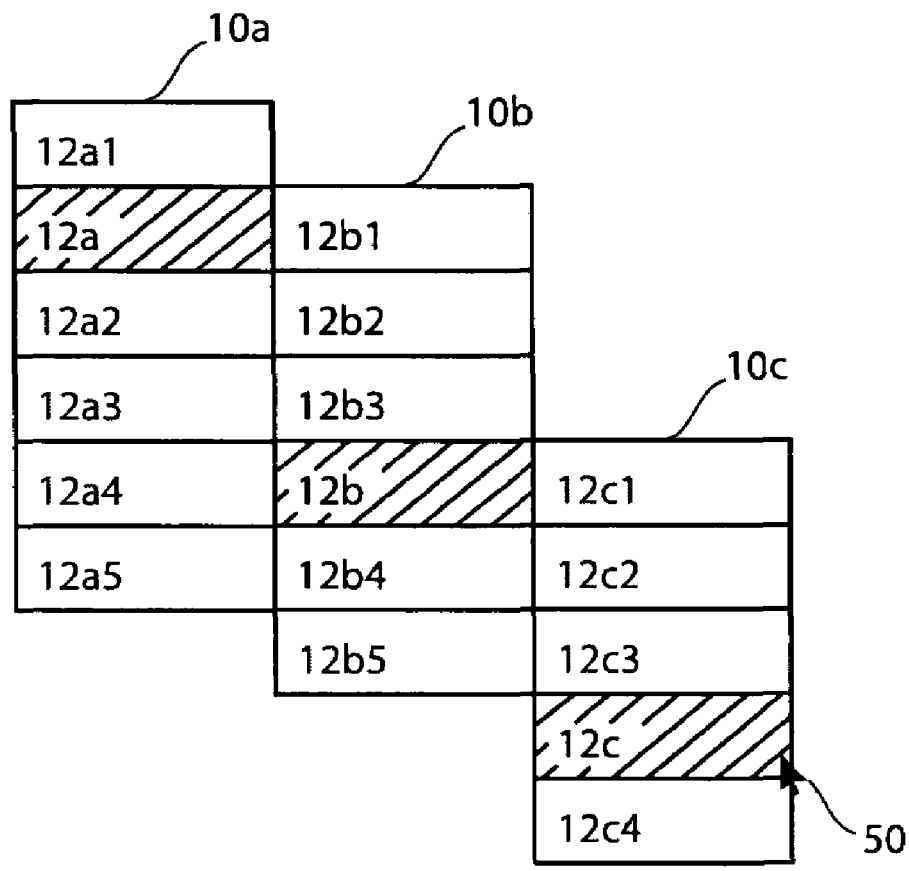
FIGS. 5A and 5B are views showing how the Active Path is assembled as the user navigates the collapsing menu system.

By manner of illustration, FIG. 5A shows how the Active Path 100 is sequentially assembled as menu items 12-*a*, 12-*b*, and 12-*c* are selected from the collapsing menu system. Active link 102-*a* corresponds to menu item 12-*a* selected from the initial or root level 10-*a*. Likewise, active link 102-*b* corresponds to menu item 12-*b* selected from level 10-*b*, and active link 102-*c* corresponds to menu item 12-*c* selected from level 10-*c*. Construction of the Active Path 100 occurs automatically as the user navigates through the menu system 10. It should be noted that active link 102-*c* is the end link 103 in the Active Path 100.

Figure 5B:
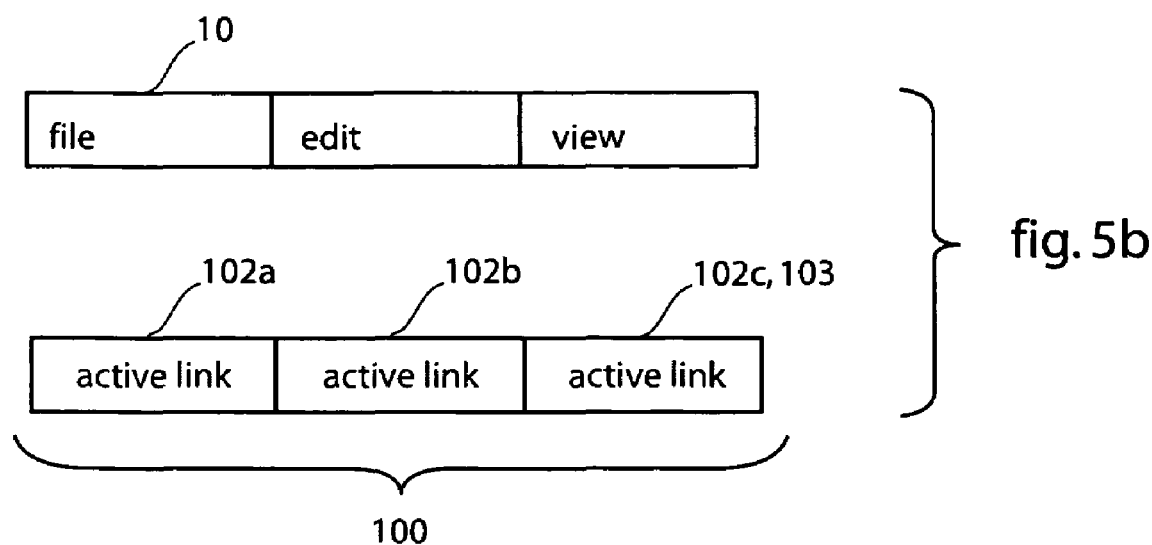

Turning now to FIG. 5B, the menu system (pull-down menu tree) 10 collapses when the user selects end node 12-*c*, whereas the Active Path 100 persists. As will be described, the active links 102 enable the user to directly access levels 10-*b* and 10-*c*, without having to navigate from the root level 10-*a*. Moreover, end link 103 enables the user to re-execute the function associated with 12-*c* directly without the need for a pre-defined short-cut.

In operation, the active links 102 of Active Path 100 are accessed using the mouse 48 and mouse buttons 48*a*, 48-*b* (FIG. 3).

Figure 5C:
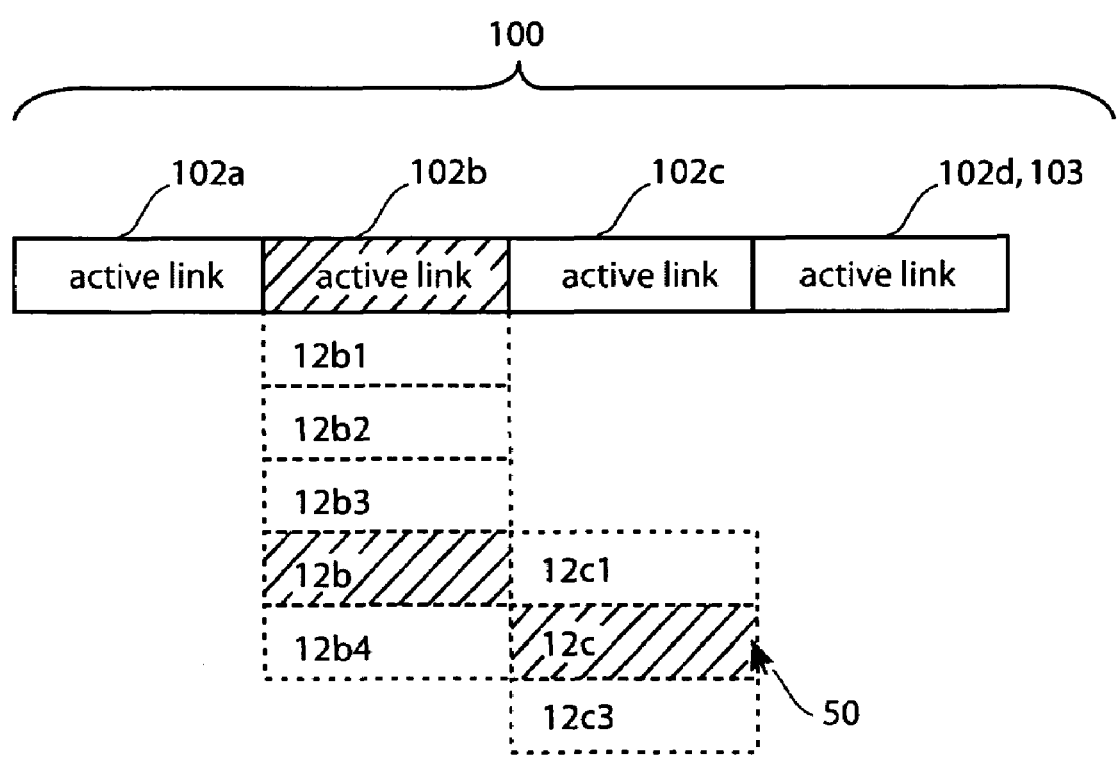
FIGS. 5C–5F are views showing how the Active Path is used to navigate.
Figure 5D:
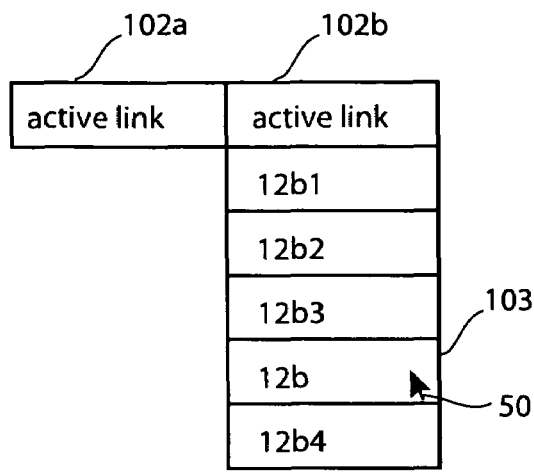

Each of the active links 102 in the Active Path 100 may be accessed by either rolling over the active link 102 with the pointer of the pointing device 38, or by immediately selecting the active link 102. As shown in FIG. 5C rolling over the active 102 simply entails manipulating the mouse 48 to position the software pointer 50 over the active link 102. Rolling over an active link 102-b causes the sibling menu items on the level corresponding the active link 102-b to be displayed. It should be noted that simply rolling over an active link 102 does not alter the Active Path 100, it merely causes the sibling menu items to be displayed.

Selection of an active link 102 is accomplished by, for example, positioning the software pointer 50 over the active link 102 and actuating (and releasing) one of the mouse buttons 48-a, 48-b. Selection of an active link 102 causes different results depending on whether or not the selected active link 102 is the end link 103 in the Active Path 100. If the selected active link 102 is not the end link 103, then selection will cause the sibling menu items 12 on the associated level 10 to be displayed and will trigger the construction of a new Active Path 100. For example, selection of menu item 12-b in FIG. 5C will result in the generation of the Active Path 100 shown in FIG. 5D.

Selection of an end link 103 will cause the immediate execution of the associated function (last function executed). Thus, the last executed function may be re-executed by simply selecting the end link 103 in the Active Path 100 (FIG. 5C).

As described above, the Active Path 100 is dynamically constructed as the user navigates the collapsing menu system, and is subsequently retained after the menu tree collapses back to the root level. In addition, the Active Path 100 may optionally be constructed each time a short-cut such as a function key or the like is used. This requires the use of a look-up table 38a (FIG. 3) stored in RAM 38. The look-up table 38a stores each of the pre-defined shortcuts and the associated data necessary to create the active path 100. According to a presently preferred embodiment, the Active Path 100 constructed is the same as would be constructed by accessing the function through the collapsing menu system.

In operation, the look-up table 38a would originally be created by the software developer during initial definition of each of the pre-defined short-cuts (function keys). Moreover, as will be explained, the look-up table 38a may be updated by the user to reference newly created short-cuts.

According to a further aspect of the present invention, the Active Path 100 may be used to define a short-cut on-the-fly. Once the Active Path 100 has been constructed, for example, by navigating the conventional collapsing menu system, the user may store the end link 103 as a shortcut within the lookup table 38a. According to a presently preferred embodiment, this is accomplished by a combination of commands. Thus, for example, the user could be prompted to define a short-cut identifier by clicking mouse button 48-b over end link 103. The Active Path 100 then stores the association between the function (or location) and the user-selected shortcut in the rewriteable table 38a.

As noted previously, the Active Path 100 of the present invention may similarly be used to navigate to a location. Notably, the Active Path 100 is created in the same manner regardless of whether the menu items 12 are functions or locations. The difference in using the Active Path 100 to navigate to locations arises after the Active Path 100 has been generated when the user selects an active link 102. More particularly, the difference is only manifested if the selected active link 102 is not the end link 103.

Notably, in the case of navigating to a location, selecting an active link 102 (other than the end link 103) triggers the access of the associated location. In contrast, when navigating to a class of functions, selection of an active link 102 (other than the end link 103) merely triggers the display of the sibling menu items on the associated level. See, FIG. 5C.

Figure 5E:
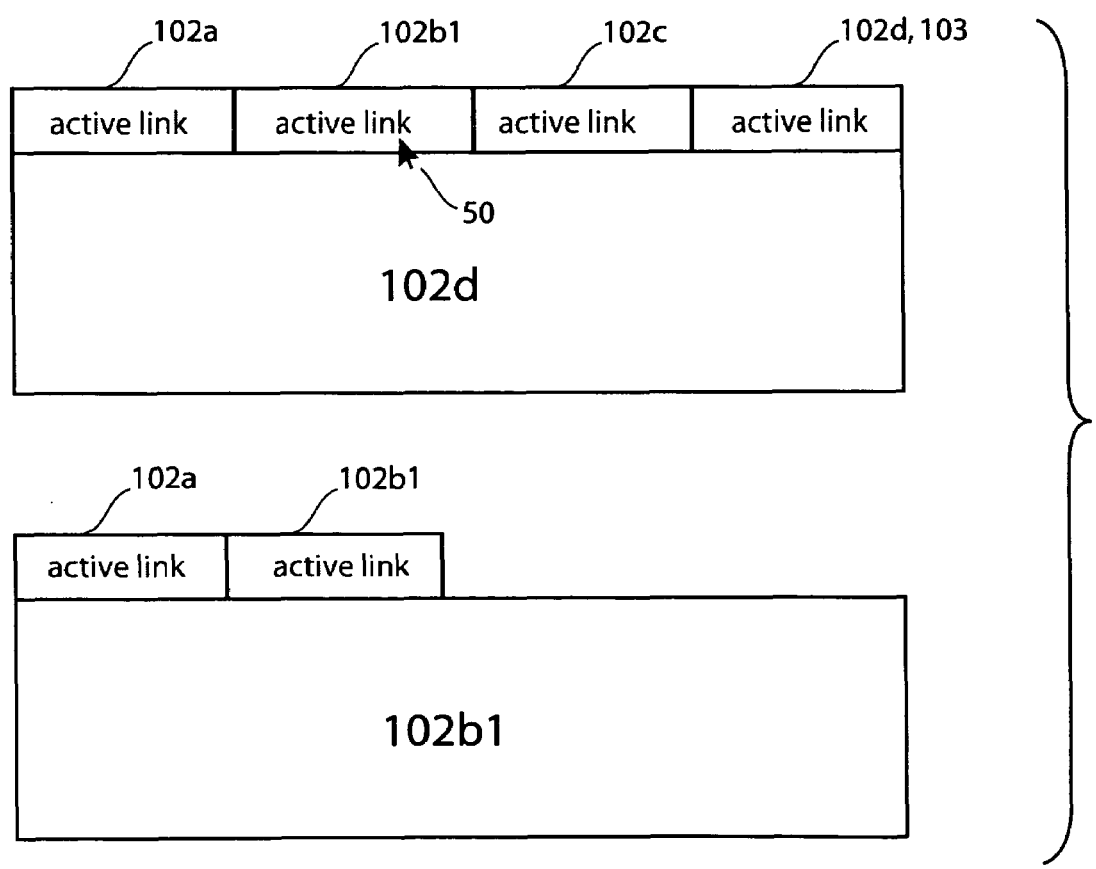

By manner of illustration, FIG. 5E shows a user selecting a location 102b1 by manipulating the pointing device 48 to position the pointer 50 over 102b1 and actuating the mouse key 48a (or 48b). As shown, the selection of a location results in the creation of a new active path 100.

Figure 1A:
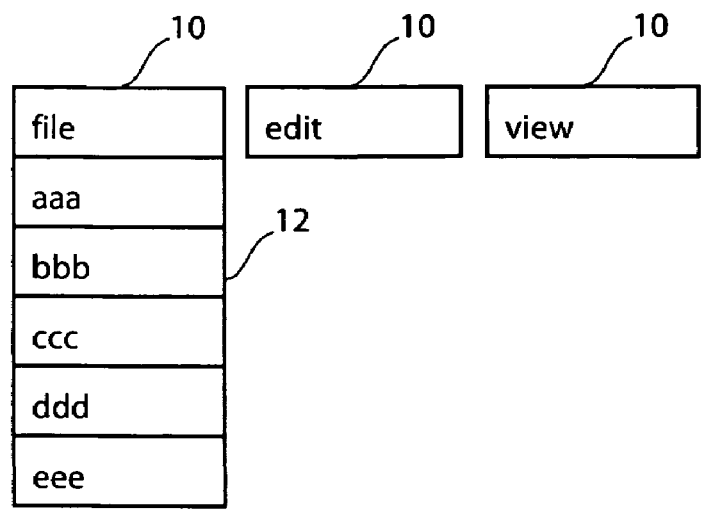
FIGS. 1A and 1B are view of a conventional collapsing menu system.
Figure 1B:
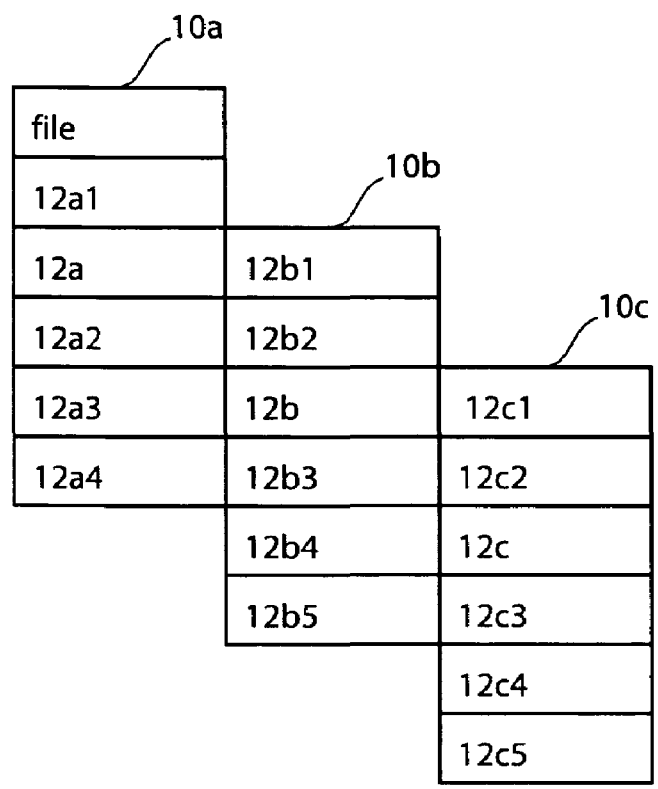
Figure 5F:
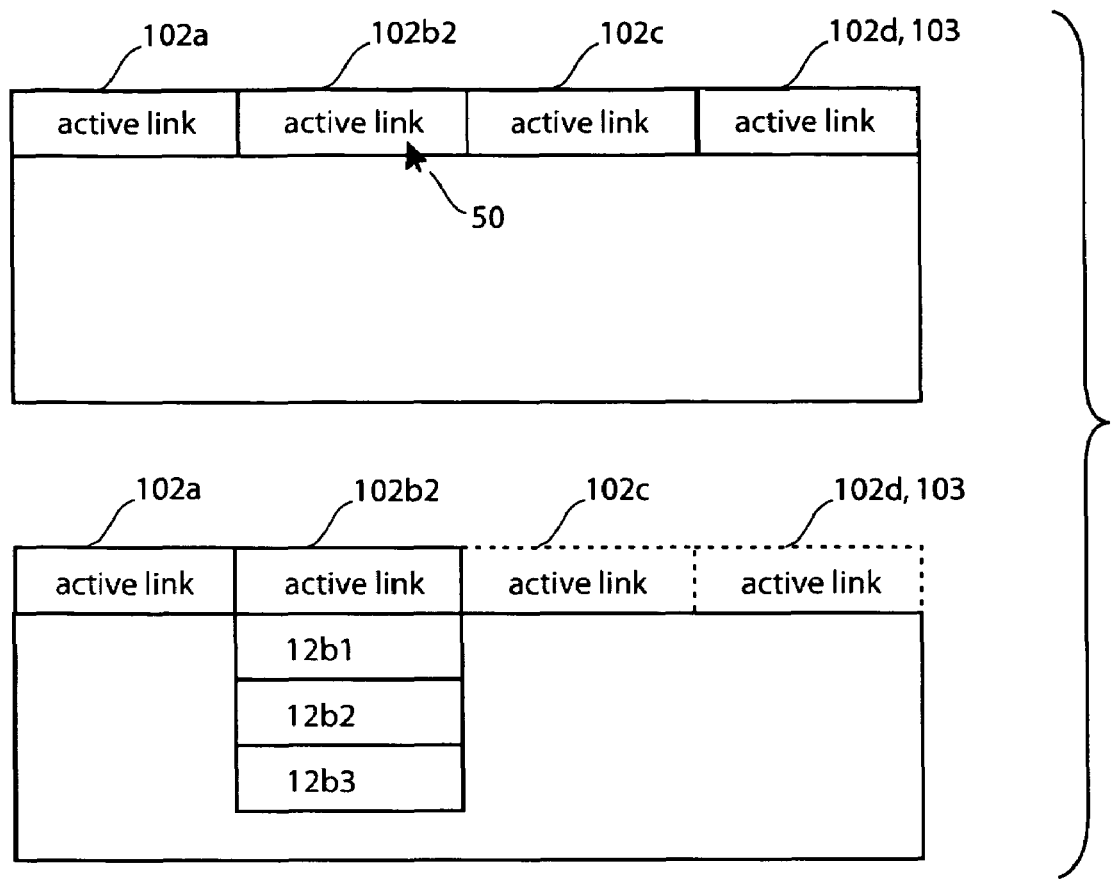

FIG. 5F shows a user selecting an active link 102b2 where the active link 102 points to a classification of items, i.e., to a sublevel in the hierarchy. Notably, in FIG. 5E 102b1 was a location, and its selection within the active path 100 results in the direct navigation to the associated location. In contrast, in FIG. 5F 102b2 is a classification of functions, and its selection results in the display of the sibling menu items. Again, the selection of active link 102b2 is accomplished by selecting a location 102b2 by manipulating the pointing device 48 to position the pointer 50 over 102b2 and actuating the mouse key 48a (or 48b).

One of ordinary skill in the art will appreciate that the Active Path 100 of the present invention may be used in standalone applications such as operating systems, word processors, spreadsheets or the like. Moreover, the Active Path may also be used in a client-server environment. Notably, the Active Path 100 may be used to navigate functions provided on a web site or to navigate between different web addresses.

In standalone applications, a range of Windows Application Programming Interface functions such as "CreateWindow" and other graphics library function calls may be used to create the graphic components of the Active Path. Any combination of mainstream programming languages such as Visual Basic, Java, C, or Delphi may be used to create the dynamic components and rollover effects.

In client server applications, the code for the Active Path may be part of the initial HTML file in form of a JavaScript/DHTML combination or separate JavaScript files (.js) containing the arrays describing the Active Path 100 and Cascading Style Sheets files (.css) containing the graphic attributes of the Active Path 100. This data may be cached locally after the initial server call.

For internet browser applications, such as Internet Explorer or Mozilla the referred embodiment foresees a replacement of the address bar with the Active Path 100 to avoid redundancy, allow the user to focus on the content and make browsing more efficient. For Internet Explorer, this would involve utilizing its custom Explorer Bars integration feature.

In standalone applications, a range of Windows Application Programming Interface functions such as "CreateWindow" and other graphics library function calls may be used to create the graphic components of the Active Path. Any combination of mainstream programming languages such as Visual Basic, Java, C, or Delphi may be used to create the dynamic components and rollover effects.

Windows Explorer may replace the Address Bar with the Active Path. This could make the display of the folder window redundant. The user may better take advantage of the screen real-estate by rolling over and "browsing" through the levels of the collapsing menu system.

In client server applications, the code for the Active Path may be part of the initial HTML file in form of a JavaScript/DHTML combination or separate JavaScript files (.js) containing the arrays describing the Active Path and Cascading Style Sheets files (.css) containing the graphic attributes of the Active Path. This data may be cached locally after the initial server call.

For internet browser applications, such as Internet Explorer or Mozilla the preferred embodiment foresees a replacement of the address bar with the Active Path to avoid redundancy, allow the user to focus on the content and to make browsing more efficient. For Internet Explorer, this would involve utilizing its custom Explorer Bars integration feature.

The Active Path of the present invention may also be used to navigate audio interfaces. A preferred embodiment for audio interfaces would allow users to navigate to the end point of a path. A certain input command, such as pressing a certain key, would read the sequence and level of the selected path. Users can then select any level of the path and navigate to a new endpoint.

Although a preferred embodiment of the Active Path navigation system of the present invention has been specifically described and illustrated, it is to be understood that variations or alternative embodiments apparent to those skilled in the art are within the scope of this invention. Since many such variations may be made, it is to be understood that within the scope of the following claims, this invention may be practiced otherwise than specifically described.

The invention claimed is:

1. A method for navigating within a multi-level hierarchical collapsing menu structure where each level in the menu contains plural items, each said item being at least one of a function, a pointer to a location, and a pointer to another level, said method comprising the steps of:
    providing a graphical user menu system displaying the items of a given level and enabling selection thereof, wherein access of said given level requires sequential access of each of the levels preceding said given level in the hierarchy;
    automatically constructing an Active Path as a sequence of hierarchical active links as items are selected using the graphical user menu system without the need for any additional interaction with the graphical user system, with one said active link corresponding to each of the items selected, each said active link being independently selectable thereby providing direct access to the hierarchical level from which the corresponding item was selected without the need to navigate using said graphical user menu system; and
    displaying the Active Path as an alternative to the graphical user menu system for navigating the multi-level hierarchical collapsing menu structure after the user has finished selecting items using the graphical user system such that the Active Path is displayed after the multi-level hierarchical collapsing menu structure has collapsed;
    wherein pre-selecting a given active link triggers the display of sibling menu items on the level associated with said given active link without disturbing the displayed Active Path.

2. The method for navigating according to claim 1, further comprising:
    providing pro-defined short-cuts enabling direct access to a given menu item; and
    automatically constructing the Active Path when a pre-defined short-cut is executed, with one said active link corresponding to each of the menu items necessary to access said given menu item using said graphical user menu system.

3. The method for navigating according to claim 1, wherein selecting a given active link triggers the execution of a function associated with said given active link.

4. The method for navigating according to claim 1, wherein selecting a given active link triggers display of information associated with said given active link.

5. The method according to claim 1, wherein a user-defined short-cut is defined on-the-fly by storing a short-cut identifier and an associated plurality of active links in a look-up table.

6. The method for navigating according to claim 1, wherein pre-selecting a given menu item displayed while pre-selecting the given active link triggers the display of subordinate menu items.

* * * * *